Feb. 23, 1960 C. L. JOHNSON ET AL 2,925,712
AIRCRAFT FUEL SYSTEM WITH FUEL HEATING MEANS
Filed Dec. 7, 1953 4 Sheets-Sheet 1
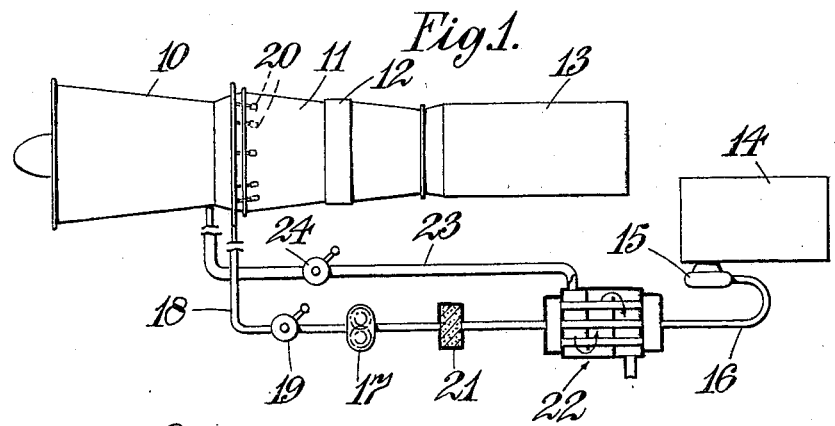
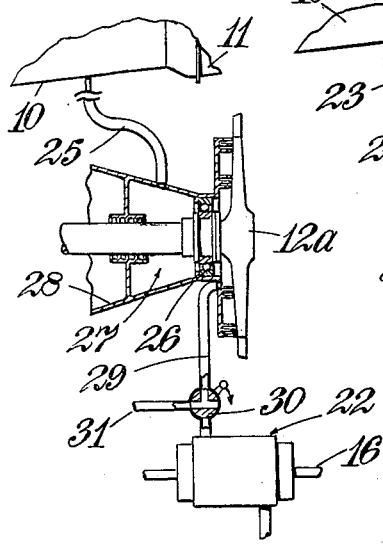
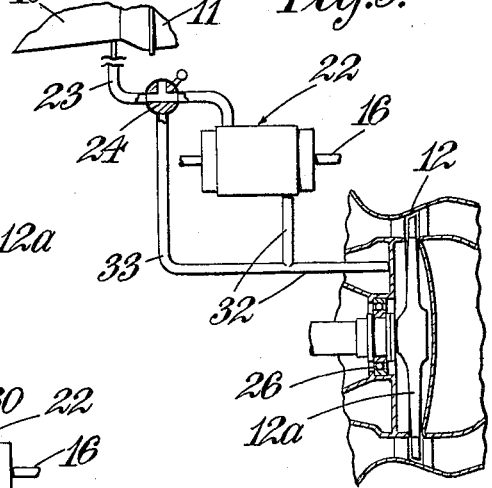
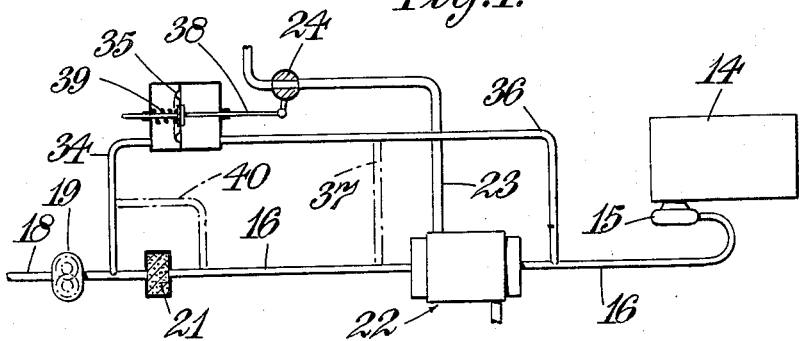

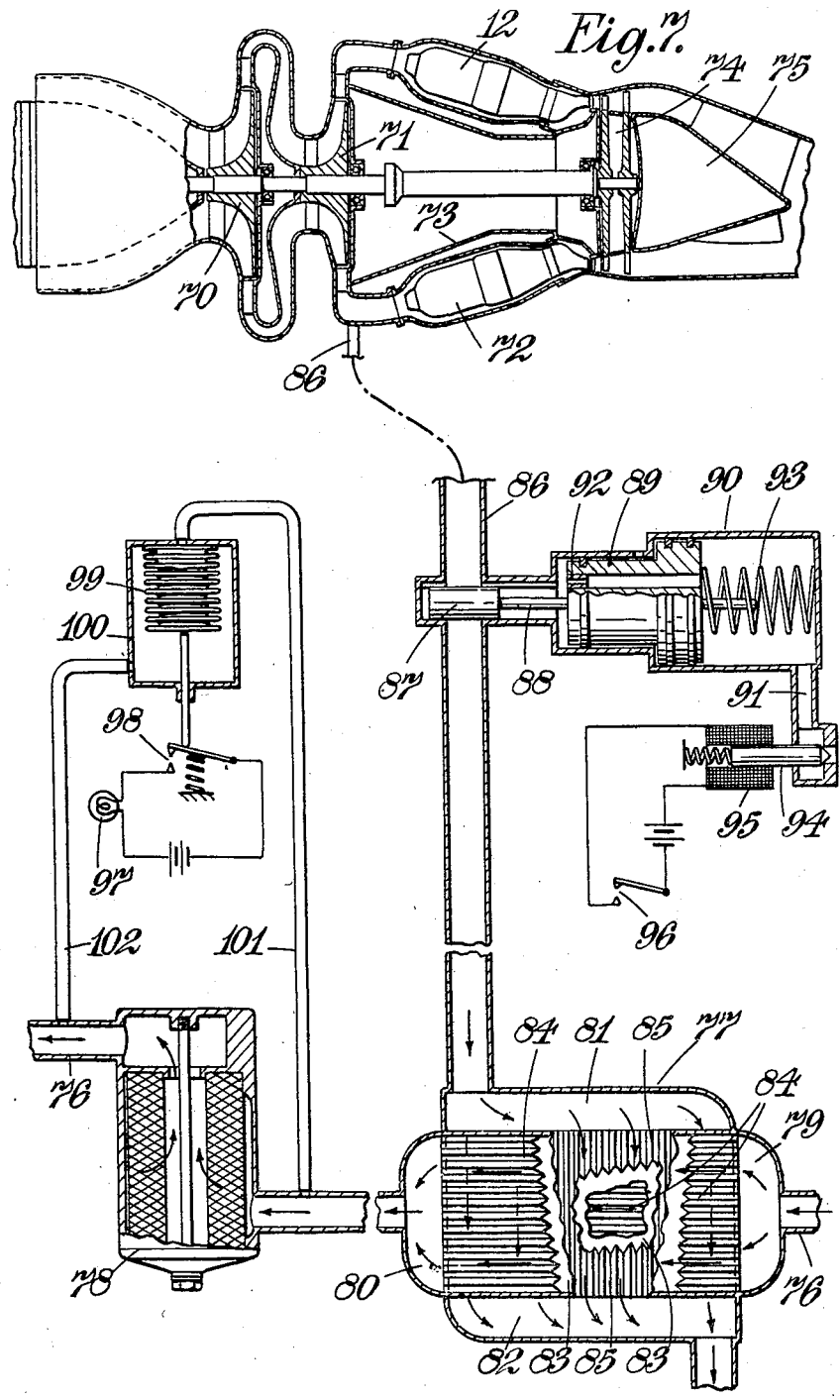

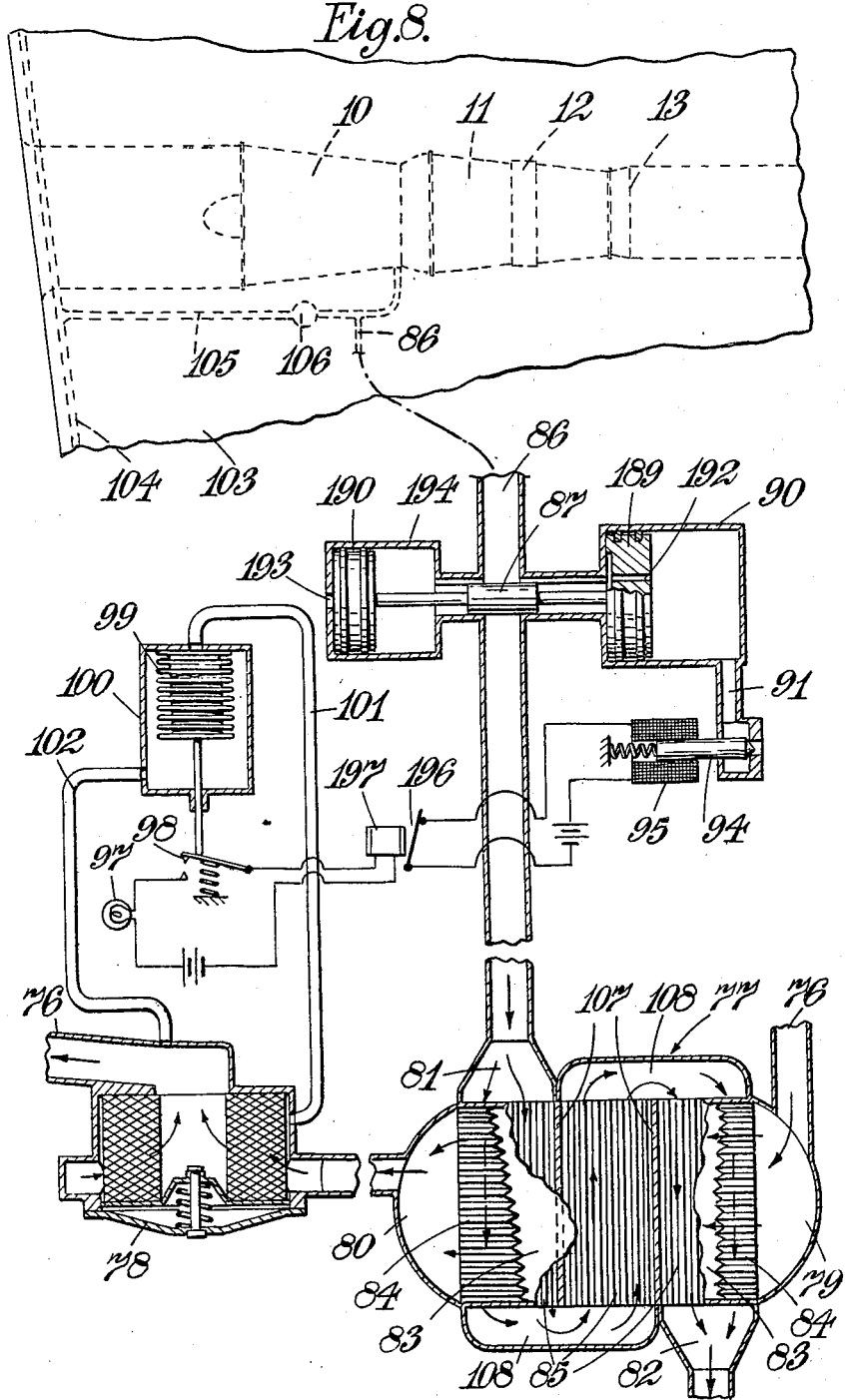

United States Patent Office 2,925,712
Patented Feb. 23, 1960

2,925,712

AIRCRAFT FUEL SYSTEM WITH FUEL HEATING MEANS

Christopher Linley Johnson, Allestree, and William Herbert London, Watnall, England, assignors to Rolls-Royce Limited, Derby, England, a British company Application December 7, 1953, Serial No. 396,622

Claims priority, application Great Britain December 12, 1952

13 Claims. (Cl. 60—39.07)

This invention relates to aircraft fuel systems and is especially concerned with the fuel systems of aircraft which are required to operate under very low atmospheric temperature conditions such as are experienced by modern aircraft when operating at high altitude.

When operating under very low temperature conditions difficulties may be experienced in maintaining a fuel supply due, for instance, to ice formation which tends to restrict the flow of fuel, or due to an increase in the viscosity of the fuel, or due to the deposition of wax, say, in a fuel tank.

This invention has for an object to provide an improved aircraft fuel system suitable for use with aircraft powered by gas-turbine engines in which difficulties due to excessive cooling of the fuel may be avoided.

According to the present invention, an aircraft fuel system comprises heat exchanger means wherein the fuel may be heated by relatively warm air derived from a compressor of an engine of the aircraft.

When the engine is a gas-turbine engine, the air employed for heating the fuel is preferably either compressed air tapped off from the delivery of the compressor of the gas-turbine engine, in which case the air may subsequently be employed for other purposes due to its high pressure, or may be low-pressure air such as air which has been tapped off from an intermediate stage of the compressor and employed for cooling engine bearings, such as are provided between a compressor and its associated driving turbine, before being passed into heat exchange with the fuel.

In one arangement, this invention is employed in a gas-turbine engine fuel system of the kind in which fuel in flowing from a fuel tank to an engine passes through a low-pressure filter, that is, a filter located in the fuel supply line on the inlet side of the engine main fuel pump. It has been found that when operating with such a fuel system in low temperature conditions, there is a tendency for ice formation in the filter which results in blockage of the filter and interruption of the fuel flow to the engine.

According to this arrangement of the invention, there is provided in the fuel supply system a heat exchanger device which is connected so that, prior to entering the filter, fuel flows through the heat exchanger to be heated therein by heat exchange with air derived from a compressor of a gas-turbine negine of the aircraft.

In another arrangement of this invention, the heat exchange between the fuel and the air derived from a compressor of a gas-turbine engine of an aircraft is employed to heat fuel in a fuel tank to avoid excessive reduction of the temperature of the fuel and thereby an excessive increase in the fuel viscosity or undesirable wax deposition within the tank. In this arrangement, for instance, the air derived from the compressor may be passed through tubes to heat the fuel tank or the fuel within the tank.

According to a feature of this invention, means is provided to control the flow of warm air to the heat-exchanger device wherein the warm air transfers heat to cold fuel. Conveniently there is provided valve means to control the supply of the warm air and the valve is arranged to be controlled by a condition in the fuel system or by an atmospheric condition to which the aircraft is subjected in flight. For instance, in an arrangement as above set forth in which a heat-exchanger device is provided in the fuel system prior to a low-pressure filter, the valve means may be controlled by pressure responsive means arranged to respond to the pressure drop in the fuel supply conduit across the filter or across the heat-exchanger device or across both the filter and the heat-exchanger device, so that when the pressure drop exceeds a selected value the valve means are operated to admit warm air to the heat-exchanger device; the selected value of the pressure drop at which the valve means is actuated to admit warm air to the heat-exchanger device may, for instance, be that which occurs when the heat-exchanger device or the filter or both have become partially blocked by ice formation.

In another example, valve means for controlling the supply of warm air for heat exchanger purposes is controlled by temperature-responsive means arranged to be responsive to the fuel temperature, so that when the fuel temperature falls below a selected value the valve means are operated to admit warm air for heat exchange purposes. This arrangement may be used when the air is used to heat a fuel tank or fuel in the tank.

As another example, the heat exchanger is connected so that it is always in communication with a supply of air at low pressure, and a by-pass is provided from upstream of the heat exchanger to atmosphere, the by-pass being controlled by valve means which is connected to a temperature-sensitive device in the fuel line downstream of the heat exchanger to be opened on increase of temperature. The valve may also be loaded by the ram pressure arising in flight of the aircraft in which the heat exchange device is installed, so that the by-pass valve is loaded by the ram pressure in the sense of closing.

The heat-exchnager device employed in arrangements according to this invention may be of any convenient form but preferably the heat-exchanger device is arranged so that the fuel makes a single pass through it. Where the compressed air supplied to the heat exchanger is tapped off directly from the delivery of the compressor, the heat exchanger may be arranged to afford a multi-pass path on the air side. The heat-exchanger device may be either a primary-surface type heat exchanger or a secondary-surface type heat exchanger.

Some arrangements according to this invention will now be described with reference to the accompanying diagrammatic drawings in which:

Figure 1 illustrates one arrangement according to this invention,

Figure 2 illustrates a modification of the arrangement of Figure 1,

Figure 3 illustrates a second modification of the arrangement of Figure 1,

Figure 4 illustrates one method of automatic control suitable for use with the arrangements of Figures 1 to 3, Figure 7 illustrates a further arrangement, and Figure 8 illustrates yet another arrangement.

Figure 5:
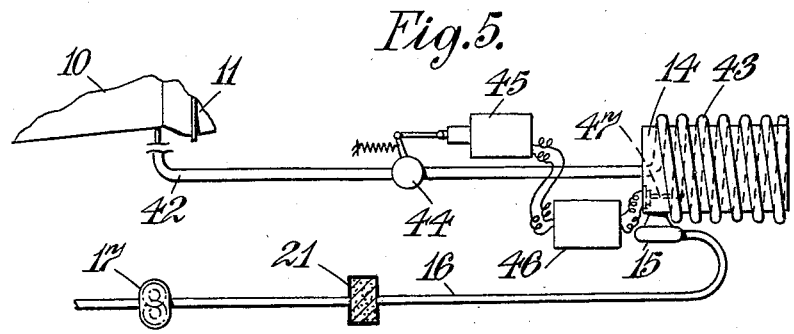
Figure 5 illustrates another arrangement.

Referring to Figure 1, there is illustrated a gas-turbine jet-propulsion engine which comprises a compressor 10, combustion equipment 11, a turbine 12 and an exhaust assembly 13.

The combustion equipment is supplied with fuel from a fuel tank 14 having associated with it a fuel tank pump 15, which is usually a centrifugal pump and which delivers fuel through a pipeline 16 to a main fuel pump 17. The delivery side of the pump 17 is connected through a pipeline 18, in which is fitted a throttle 19, to fuel injection nozzles 20.

A filter 21 is provided in the fuel line 16 between the two pumps 15 and 17, and to avoid ice formation in the filter or an undesirable increase in the viscosity of the fuel or undesirable wax deposition from the fuel, a heat exchanger 22 is provided in the pipeline 16 between the pump 15 and filter 21.

In the heat exchanger, the fuel can be heated for instance by heat exchange with hot air abstracted from the delivery end of the compressor 10 of the engine, and for this purpose one flow path of the heat exchanger 22 is connected by a conduit 23 to the delivery of the compressor 10. A valve 24 is provided in the conduit 23 to control the supply of hot air to the heat exchanger 22, and the valve 24 may be controlled either manually or automatically in any desired manner.

The heat exchanger is shown in this arrangement as being a multi-pass heat exchanger.

Referring now to Figure 2, there is shown an arrangement in which instead of taking the hot air from the delivery of the compressor 10, the hot air is air which has previously been used for cooling purposes in the engine. In the arrangement illustrated, the air is tapped-off through a conduit 25 from an intermediate stage of the compressor 10 and is conveyed to adjacent a bearing 26 for the turbine rotor 12a. The air passes from the conduit 25 into a chamber 27 provided in stationary structure 28 to accommodate the bearing 26. The air after cooling the bearing 26 is abstracted from the chamber 27 through a conduit 29 containing a valve 30 and leading to the heat exchanger 22. In this arrangement when the valve 30 is in one position, the air which has been used for cooling the bearing is passed through the heat exchanger 22 and, when the valve is in a second position, the air flows to atmosphere through a branch conduit 31 and is prevented from flowing into the heat exchanger 22.

The air after leaving the heat exchanger 22 may, in the arrangement of Figure 1, be employed for another purpose in the engine. Thus, for example, referring to Figure 3, the air leaving the heat exchanger 22 may be passed through a conduit 32 to adjacent the upstream face of the turbine rotor disc 12a there to be used for sealing the space bounded by the turbine rotor disc against ingress of hot gases from the working fluid passage. In this arrangement the valve 24 is conveniently arranged so that in one position the tapped-off air passes into the heat exchanger 22 and in a second position the heated air passes into a conduit 33 by-passing the heat exchanger 22 and leading directly from the valve 24 to the conduit 32.

Referring now to Figure 4, there is illustrated one manner in which the valve 24 can be controlled automatically. In the event that ice forms in the filter 21, the pressure drop in the pipeline 16 across the filter will increase and use may be made of this fact to control the valve 24. Thus a first tapping connection 34 may be taken from downstream of the filter to one side of a flexible diaphragm 35, and a second tapping connection taken to the other side of the diaphragm 35, the second connection being either a connection 36 to upstream of the heat exchanger 22 or a connection 37 to between the filter 21 and heat exchanger 22. The diaphragm 35 is connected by an operating rod 38 to operate the valve 24 and the valve is conveniently loaded by a spring 39 into one of its operating positions. Instead of employing the pressure drop across the filter 21 or across the filter 21 and heat exchanger 22, the pressure drop across the heat exchanger 22 alone (due to increased viscosity of the fuel or to the formation of ice in the heat exchanger) may be employed to operate the diaphragm 35. In this case the pressure connection 36 and a pressure connection 40 to between the filter and heat exchanger will be employed.

It will be arranged that when the pressure drop is above a selected value the spring 39 is compressed and the valve 24 is open as indicated. When the pressure drop is below the given value the spring 39 prevents the valve 24 from being opened by the fluid loads on the diaphragm 35.

Referring now to Figure 5, there is illustrated an arrangement in which instead of employing a heat exchanger in a fuel supply line, hot air is employed to heat the fuel tank 14. For this purpose there is provided a conduit 42 connected say with a delivery of the compressor 10 and leading to a coil 43 either encircling the fuel tank 14 as shown or located within the fuel tank 14. A valve 44 is provided to control the supply of air to the coil 43 through the conduit 42 and the valve 44 is operated by a solenoid device 45 conveniently fed with energising current through an amplifier 46 operation of which is effected by an electrical temperature-responsive device 47, such as a thermocouple, disposed within the fuel tank so as to be responsive to the temperature of the fuel. It is arranged that, when the temperature sensed by the temperature-responsive device 47 falls below a selected value, the solenoid 45 is energised to open the valve 44.

Figure 6:
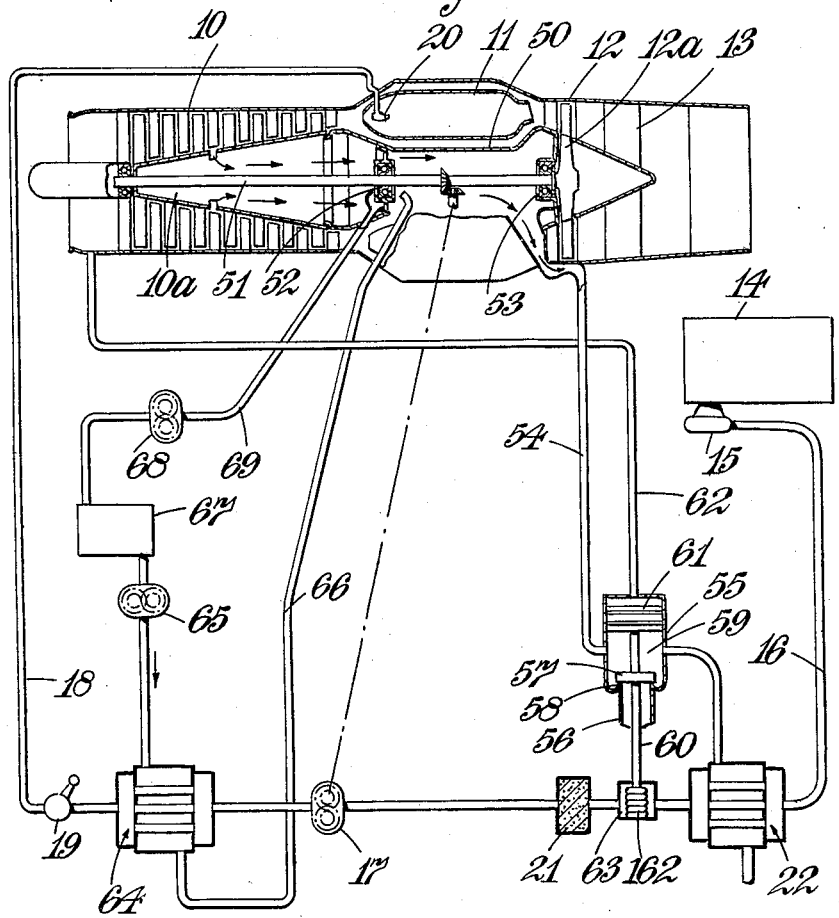
Figure 6 illustrates yet another arrangement.

Referring now to Figure 6, there is illustrated an arrangement in which the supply of hot air to the heat exchanger 22 is controlled in accordance with the temperature of the fuel and also in accordance with the ram pressure within the inlet of the compressor 10.

Moreover the arrangement employs for heating purposes in the heat exchanger 22 low-pressure air which has been used for bearing cooling in the engine. Thus, the air is tapped off from an intermediate stage of the compressor 10 through the rotor 10a thereof and is allowed to flow from the rotor 10a into an intermediate casing structure 50 which is disposed within the combustion equipment 11 and outside a driving shaft 51 drivingly connecting the compressor rotor 10a with the turbine rotor 12a. The intermediate casing 50 accommodates those bearings 52, 53 for supporting the rotor assembly, which are disposed between the two rotors 10a, 12a. The bearing cooling air leaves the intermediate casing 50 through a conduit 54 having connected in it a valve structure 55 which determines the proportion of the air flowing in the conduit 54 which may pass directly to atmosphere through a branch pipe 56.

The valve structure 55 comprises a valve element 57 co-operating with a seat 58 which surrounds an orifice leading from a valve chamber 59 to the conduit 56 open to atmosphere. The valve chamber 59 forms a part of the flow path of the conduit 54. The valve element 57 is carried by an operating rod 60 having at one end a piston 61 arranged to form one movable wall of the chamber 59. The opposite face of the piston 61 is loaded by the ram pressure within the intake of the compressor 10, a conduit 62 being provided between the intake of the compressor 10 and one end of the casing of the valve structure 55. The operating rod 60 of the valve element 57 is also connected to a temperature-responsive capsule 162 accommodated in a chamber 63 through which the fuel flows from the heat exchanger 22 to the filter 21. It is arranged that the ram pressure operates to load the valve element 57 to close it and that increase of temperature in chamber 63 causes the capsule to load the valve element 57 in the sense of opening it.

In operation, as the fuel temperature increases so the temperature-responsive capsule 162 tends to expand and to lift the valve element 57 from its seat 58 against the ram pressure load and on opening of the valve 57 a quantity of the bearing cooling air flowing in conduit 54 passes into the branch conduit 56 and thus directly to atmosphere. As the ram pressure increases so the load holding the valve element 57 on its seating 58 increases, thus increasing the fuel temperature at which the valve element 57 commences to lift off its seat 58.

It will thus be seen that this arrangement prevents overheating the fuel when the fuel temperature is high.

The arrangement also ensures that when the pressure difference available to produce a flow of cooling air over the bearings is lowest, the valve 57 will be opened at the lowest acceptable fuel temperature by means of capsule 162; opening of the valve will clearly cause an increase in cooling air flow.

In this arrangement there is also illustrated the provision of a fuel-cooled oil cooler in the form of a heat exchanger 64 having one flow path connected in the fuel supply line 18 downstream of the main fuel pump 17 and having its other flow path connected in the engine oil system between a main oil pump 65 and the oil delivery pipe 66 leading to the engine. The oil storage tank is indicated at 67 and the oil scavenge pump at 68, the oil scavenge pump being located in a scavenge pipe 69 leading back from the engine to the oil tank 67.

Referring now to Figure 7, there is illustrated another arrangement. In this arrangement, the engine comprises a two-stage centrifugal compressor whereof the rotors are indicated at 70, 71, arranged to deliver to combustion equipment 72 disposed around a casing 73. The combustion equipment 72 delivers to a multi-stage turbine 74 and the exhaust from the turbine passes into an exhaust unit 75.

The fuel system for supplying fuel to the engine is also partly shown and comprises a low-pressure fuel pipe 76 which conveys fuel from the booster pump delivery to the main fuel pump, and has fitted in it a heat exchanger 77 and a low-pressure filter 78. The filter may if desired form part of a unitary structure comprising other elements of the fuel system and controls therefor, but since these elements are well known they are not illustrated.

The heat exchanger 77 comprises a fuel inlet manifold 79, a fuel outlet manifold 80, a heating fluid inlet manifold 81, and a heating fluid outlet manifold 82. The heat exchanger section comprises a number of plain heat transfer walls 83 spaced apart across the section and corrugated elements 84, 85, arranged alternately in the spaces between the walls 83, the elements 84 having the corrugations extending between and opening into the fuel manifolds 79, 80, and the elements 85 extending between and opening into the heating fluid manifolds 81, 82.

The heating fluid is again hot air and in this case is tapped off from the delivery of the second stage centrifugal compressor 71 through pipe 86. The supply of hot air is controlled by a carbon slide valve 87 which is connected by its operating rod 88 to a differential piston 89 arranged in a cylinder 90 having an outlet 91. The smaller-area end of the piston 89 is open to the air pressure in pipe 86 upstream of valve 87 and the larger area side of the piston 89 is connected to the smaller area side by a metering port 92. A spring 93 urges the piston 89 into a position in which the valve 87 is closed. The outlet 91 is connected to atmosphere under control of a valve 94 which is operated by a solenoid 95. When the valve 94 is closed the pressures on each end face of the piston 89 are equal and the valve 87 is closed. When the solenoid is energised and the valve 94 is open, the pressure on the larger-area side of the piston 89 is substantially lower than that on the smaller-area side and the piston 89 is moved to the right and the valve 87 thus opened.

The solenoid 95 is shown as being energised by closure of a manually-operated switch 96 and the switch will be closed to open valve 87 when the pilot desires to initiate fuel heating, for instance when a warning lamp 97 is alight.

The lamp may be fed with current under control of a switch 98 which is operated by a pressure-responsive expansible capsule 99 housed in a chamber 100. The interior of capsule 99 is connected by a pipe 101 to the pipe line 76 upstream of the filter 78 and the interior of the chamber 100 is connected by a pipe 102 to downstream of the filter 78, and thus, when the pressure drop across the filter 78 is too high, the capsule 99 expands closing switch 98 and lighting the lamp 97.

Referring now to Figure 8, there is illustrated a similar but modified arrangement which may be employed with an engine 10, 11, 12, 13 (as described with reference to Figure 1) arranged in an aircraft wing 103 having anti-icing means 104 supplied with hot air from the engine compressor 10 through a conduit 105 under control of a valve 106.

In this case instead of connecting pipe 86 direct to the engine, it is connected to the anti-icing air supply conduit 105, and the solenoid 95 is energised automatically under control of the pressure-responsive capsule 99. For this purpose the warning light circuit also includes a relay coil 197 which, when energised, closes contacts 196 in the circuit of the solenoid 95.

This arrangement also includes a modified form of the control for valve 87. The differential piston 81 is replaced by a pair of pistons 189, 190, one on each side of the valve 87. The piston 189 is of larger area than the piston 190 and has its ends connected by a metering port 192. The outer end of piston 190 is subjected to atmospheric pressure through port 193 in cylinder 194 of the piston 190. As in the arrangement of Figure 7, opening of bleed valve 94 causes a reduction of pressure on the right hand side of piston 189, and thus causes opening movement of the slide valve 87.

The heat exchanger 77 is of similar construction to that shown in Figure 7 but is a multi-pass heat exchanger, there being provided walls 107 to divide each heating fluid space into three sections and transfer manifolds 108 for conveying the heating fluid between the sections.

It will be appreciated that in order to prevent blockage of for example the low-pressure filter by the freezing of water which may be in solution or in suspension in the fuel, and which may be trapped by the filter, the temperature of the fuel passing through the filter should be significantly above 0° C., and in order to prevent the precipitation of wax crystals which may be trapped by the filter and may thus block it, the temperature of the fuel should be maintained above its cloud point or "freezing point" which may be for example —40° C.

In those cases in which there is a danger of the deposition of wax crystals in the fuel tank, an arrangement such as that shown in Figure 5 may be employed. In an alternative arrangement to meet this contingency, the fuel in the fuel tank may be recirculated through a heat exchanger device, where it is warmed by heat exchange with air as described with respect to the remaining figures, and led back to the fuel tank instead of being fed immediately to the engine. In this manner the temperature of the fuel in the tank is maintained above the desired minimum value. Either the booster pump 15 or a separate recirculating pump, which may be of relatively small capacity, may be used to cause the recirculating flow.

We claim:

1. A fuel system for an aircraft having a fuel storage tank and powered by an engine having an air compressor, comprising means for preventing fuel starvation of said engine due to low atmospheric temperatures including heat-exchange means having fuel and air spaces in heat exchange relation, a fuel inlet, a fuel outlet, an air inlet, and an air outlet, a fuel pipe connecting the storage tank and the fuel inlet, a connection from the fuel outlet to the engine, a second connection connected to convey pressurized air from the air compressor to the air inlet, a third connection from the air outlet to a region of lower air pressure, a slide valve in said second connection adapted to control the flow of air to the heat-exchange means, piston means connected to actuate the slide valve, and means to control fluid pressure acting on the piston means, said piston means comprising a differential-area piston and cylinder, whereof the cylinder space at the smaller-area end of the piston is connected to said second connection upstream of the slide valve to be subjected to the compressed air pressure, a metering orifice connecting the cylinder space at the larger-area end of the piston to the cylinder space at the smaller-area end of the piston, a bleed passage leading from the cylinder space at the larger-area end of the piston to atmosphere, and bleed control valve means to control flow through the bleed passage.

2. An aircraft power plant installation comprising a gas-turbine engine having a compressor, combustion equipment, and a turbine in flow series, the compressor delivering compressed air to the combustion equipment and the turbine driving the compressor; a liquid fuel storage tank; heat-exchange means comprising a fuel space and an air space in heat exchange relation, the fuel space having a fuel inlet and a fuel outlet and the air space having an air inlet and an air outlet; a first connection interconnecting the fuel storage tank and the fuel inlet; a second connection interconnecting the fuel outlet and the combustion equipment to deliver liquid fuel into the combustion equipment; a third connection leading from the air compressor to the air inlet whereby air heated by compression in said compressor enters said air space; a fourth connection from said air outlet to a region of lower air pressure; a slide valve in said third connection to control the flow of air to the heat-exchange means, a first piston, a first cylinder containing said first piston and connected at one end to atmosphere and connected at its opposite end to said third connection upstream of the slide valve, so that the pressure therein is at the pressure of the air in said third connection, a second piston having a larger effective area than said first piston, a second cylinder containing said second piston and connected at a first end to said third conection upstream of the slide valve and connected at its opposite end to the first end through a metering orifice, a bleed passage leading from said opposite end of the second cylinder, and a bleed valve to control the flow through said bleed passage, the said pistons being connected to the slide valve so that the surfaces thereof which are subjected to the pressure of the air in the third connection upstream of the slide valve face one another on opposite sides of the slide valve.

3. A fuel system for an aircraft having a fuel storage tank and powered by an engine having an air compressor, comprising means for preventing fuel starvation of said engine due to low atmospheric temperature including heat-exchange means having fuel and air spaces in heat exchange relation, a fuel inlet, a fuel outlet, an air inlet, and an air outlet, a fuel pipe connecting the storage tank and the fuel inlet, a connection from the fuel outlet to the engine, a second connection connected to convey pressurized air from the air compressor to the air inlet, a third connection from the air outlet to a region of lower air pressure, a slide valve in said second connection adapted to control the flow of air to the heat-exchange means, piston means connected to actuate the slide valve, and means to control fluid pressure acting on the piston means, said piston means comprising a differential-area piston and cylinder, whereof the cylinder space at the smaller-area end of the piston is connected to said second connection upstream of the slide valve to be subjected to the compressed air pressure, a metering orifice connecting the cylinder space at the larger-area end of the piston to the cylinder space at the smaller-area end of the piston, a bleed passage leading from the cylinder space at the larger-area end of the piston to atmosphere, bleed control valve means to control flow through the bleed passage, and manually operable control means operatively connected to said bleed control valve means.

4. An aircraft power plant installation as claimed in claim 2 comprising pressure-responsive means arranged to be responsive to a pressure drop in the fuel system due to the flow of fuel therethrough, and arranged to open said bleed valve when the value of said pressure drop exceeds a selected value.

5. An aircraft power plant installation comprising a gas-turbine engine having a compressor, combustion equipment, and a turbine in flow series, the compressor delivering compressed air to the combustion equipment and the turbine driving the compressor; a liquid fuel storage tank; heat-exchange means comprising a fuel space and an air space in heat exchange relation, the fuel space having a fuel inlet and a fuel outlet and the air space having an air inlet and an air outlet; a first connection interconnecting the fuel storage tank and the fuel inlet; a second connection interconnecting the fuel outlet and the combustion equipment to deliver liquid fuel into the combustion equipment; a third connection leading from the air compressor to the air inlet whereby air heated by compression in said compressor enters said air space; a fourth connection from said air outlet to a region of lower air pressure; and valve means in said third connection operable to control the supply of compressed air under low atmospheric temperature conditions, whereby under such conditions the liquid fuel is heated in the heat-exchange means and ice formation in the fuel is prevented; and pressure-responsive means responsive to a pressure drop in the fuel system due to fuel flow in a part at least of the flow path connecting the fuel tank and the combustion equipment, and connected to open said valve means when said pressure drop exceeds a selected value.

6. An aircraft power plant installation as claimed in claim 5 comprising also a fuel filter in said second connection through which fuel flowing to the combustion equipment passes and pressure connections from said second connection on each side of said filter to said pressure-responsive means whereby said pressure-responsive means is responsive to the pressure drop across said fuel filter.

7. An aircraft power plant installation as claimed in claim 5 comprising also a fuel filter in said second connection and pressure connections from said first connection upstream of the heat-exchange means and from said second connection downstream of the fuel filter to said pressure responsive means, whereby said pressure-responsive means is responsive to the total pressure drop across the heat-exchange means and the filter.

8. An aircraft power plant installation as claimed in claim 5 comprising pressure connections from said first connection upstream of the heat-exchange means and from said second connection downstream of the heat-exchange means to said pressure-responsive means, whereby said pressure-responsive means is responsive to the pressure drop in the fuel system due to flow of fuel through said heat-exchange means.

9. An aircraft power plant installation comprising a gas-turbine engine having a compressor, combustion equipment, and a turbine in flow series, the compressor delivering compressed air to the combustion equipment and the turbine driving the compressor; a liquid fuel storage tank; heat-exchange means comprising a fuel space and an air space in heat exchange relation, the fuel space having a fuel inlet and a fuel outlet and the air space having an air inlet and an air outlet; a first connection interconnecting the fuel storage tank and the fuel inlet; a second connection interconnecting the fuel outlet and the combustion equipment to deliver liquid fuel into the combustion equipment; a third connection leading from the air compressor to the air inlet whereby air heated by compression in said compressor enters said air space, a fourth connection from said air outlet to a region of lower air pressure; and valve means in said third connection operable to control the supply of compressed air under low atmospheric temperature conditions, whereby under such conditions the liquid fuel is heated in the heat-exchange means and ice formation in the fuel is prevented; a by-pass conduit between said third connection and atmosphere, a valve member adapted to close-off said by-pass conduit from said third connection, ram-pressure-responsive means responsive to the ram pressure within the engine intake and connected to said valve member to load it in the sense of closing on increase of ram pressure, and temperature-responsive means responsive to the fuel temperature in said second connection and connected to said valve member to load it in the sense of opening on increase of said fuel temperature.

10. An aircraft power plant installation comprising a gas-turbine engine having a compressor, combustion equipment, and a turbine in flow series, the compressor delivering compressed air to the combustion equipment and the turbine driving the compressor; a liquid fuel storage tank; heat-exchange means comprising a fuel space and a air space in heat exchange relation, the fuel space having a fuel inlet and a fuel outlet and the air space having an air inlet and an air outlet; a first connection interconnecting the fuel storage tank and the fuel inlet; a second connection interconnecting the fuel outlet and the combustion equipment to deliver liquid fuel into the combustion equipment; a third connection leading from the air compressor to the air inlet whereby air heated by compression in said compressor enters said air space; a fourth connection from said air outlet to a region of lower air pressure; valve means in said third connection operable to control the supply of compressed air under low atmospheric temperature conditions, whereby under such conditions the liquid fuel is heated in the heat-exchange means and ice formation in the fuel is prevented; and means responsive to a differential pressure between two points in the fuel system and connected to said valve means to open the valve means under low temperature atmospheric conditions.

11. An aircraft power plant installation as claimed in claim 10 wherein said fourth connection includes means for sealing a space bounded by a turbine rotor disc against ingress of hot gases, through which space the air passes between the air outlet of the heat-exchange means and atmosphere.

12. An aircraft power plant installation as claimed in claim 10 wherein the third connection is connected to an intermediate stage of the compressor and includes passages through which the compressed air passes to cool a bearing of the engine, upstream of the air inlet of the heat-exchange means.

13. An aircraft power plant installation comprising a gas turbine engine having a compressor, combustion equipment, and a turbine in flow series, the compressor delivering compressed air to the combustion equipment and the turbine driving the compressor; a liquid fuel storage tank; heat-exchange means comprising a fuel space and an air space in heat exchange relation, the fuel space having a fuel inlet and a fuel outlet and the air space having an air inlet and an air outlet; a first connection interconnecting the fuel storage tank and the fuel inlet; a second conncetion interconnecting the fuel outlet and the combustion equipment to deliver liquid fuel into the combustion equipment; a third connection leading from the air compressor to the air inlet whereby air heated by compression in said compressor enters said air space; a fouth connection from said air outlet to a region of lower air pressure; and valve means in said third connection operable to control the supply of compressed air under low atmospheric temperature conditions, whereby under such conditions the liquid fuel is heated in the heat-exchange means and ice formation in the fuel is prevented, said valve means comprising a slide valve element in said third connection, pressure-responsive means connected to cause sliding of the slide valve, a source of pressure fluid connected to said pressure-responsive means to load it, and means to vary the pressure load acting on the pressure-responsive means thereby to actuate the slide valve.

References Cited in the file of this patent

UNITED STATES PATENTS

| | | |
|---|---|---|
| 1,300,600 | Giesler | Apr. 15, 1919 |
| 1,318,068 | Giesler | Oct. 7, 1919 |
| 1,384,512 | Buchi | July 12, 1921 |
| 1,486,299 | Powell | Mar. 11, 1924 |
| 2,435,990 | Weiler | Feb. 17, 1948 |
| 2,474,258 | Kroon | June 28, 1949 |
| 2,479,776 | Price | Aug. 23, 1949 |
| 2,599,470 | Meyer | June 3, 1952 |
| 2,675,671 | Malgieri | Apr. 20, 1954 |
| 2,676,458 | Hill | Apr. 27, 1954 |
| 2,718,753 | Bridgeman | Sept. 27, 1955 |
| 2,749,087 | Blackman et al. | June 5, 1956 |
| 2,768,496 | Stamm et al. | Oct. 30, 1956 |

OTHER REFERENCES

Richardson: "Heating Fuels for Injection Engines," The Pennsylvania State College Bulletin, Technical Bulletin No. 16, April 22, 1933, 17 pages.